US007196860B2

(12) United States Patent
Alex (10) Patent No.: US 7,196,860 B2
(45) Date of Patent: Mar. 27, 2007

(54) CIRCUIT AND METHOD FOR REFRESHING DATA RECORDED AT A DENSITY SUFFICIENTLY HIGH TO UNDERGO THERMAL DEGRADATION

(75) Inventor: Michael Alex, Fremont, CA (US)

(73) Assignee: Komag, Inc., San Jose, CA (US)

( * ) Notice: Subject to any disclaimer, the term of this patent is extended or adjusted under 35 U.S.C. 154(b) by 98 days.

(21) Appl. No.: 10/660,873
(22) Filed: Sep. 12, 2003

(65) Prior Publication Data

US 2004/0047062 A1 Mar. 11, 2004

Related U.S. Application Data (63) Continuation of application No. 10/213,337, filed on Aug. 5, 2002, now Pat. No. 6,628,466, which is a continuation of application No. 09/369,646, filed on Aug. 6, 1999, now Pat. No. 6,429,984.

(51) Int. Cl.
*G11B 27/36* (2006.01)
*G11B 5/09* (2006.01)
(52) U.S. Cl. .......................... 360/31; 360/53
(58) Field of Classification Search .............. 360/31, 360/53
See application file for complete search history.

(56) References Cited

U.S. PATENT DOCUMENTS 4,247,916 A 1/1981 Erb ................. 365/185.03

(Continued)

FOREIGN PATENT DOCUMENTS

EP 0 220 382 5/1987

(Continued)

OTHER PUBLICATIONS

Lu et al, Thermal Instability at 10 Gbit/(sq. inch) magnetic recording, Nov. 1994, IEEE Transactions on Magnetics, vol. 30, No. 6, pp. 4230-4232.*

*Primary Examiner*—Andrea Wellington
*Assistant Examiner*—Dan I Davidson
(74) *Attorney, Agent, or Firm*—Silicon Valley Patent Group LLP (57) ABSTRACT

An apparatus and method write data to a storage medium, and subsequently automatically refresh the data to avoid loss of the data due to spontaneous thermal degradation. The apparatus and method may check whether an indicator (also called "refresh indicator") if saved contemporaneous with writing of the data satisfies a predetermined condition indicating that the data needs to be refreshed. If so, a "refresh" operation is performed, wherein the to-be-refreshed data is read from and written back to the same storage medium. The refresh indicator can be any parameter that indicates a need to refresh the data prior to occurrence of one or more soft errors. In one example, the apparatus and method read the data back contemporaneous with writing of the data, and measure an amplitude of a readback signal and store, as the refresh indicator, a predetermined fraction (e.g. half) of the measured value (i.e., a threshold number). When a current value of the amplitude falls below the stored value, the data is refreshed. In another example, a duration (or a fraction thereof) for which the data can be read without any error is added to the current date, to compute a date in future when the data needs to be refreshed, and the computed date is stored as the refresh indicator. In this example, the apparatus and method determine if the stored date is older than a current date, and if so perform the refresh operation, and also recalculate and reset the stored date.

62 Claims, 9 Drawing Sheets

U.S. PATENT DOCUMENTS

| | | | |
|---|---|---|---|
| 4,672,483 A | 6/1987 | Kawada | 360/51 |
| 5,923,485 A * | 7/1999 | Ito | 360/31 |
| 6,026,024 A | 2/2000 | Odani | 365/185.22 |
| 6,266,199 B1 * | 7/2001 | Gillis et al. | 360/31 |
| 6,429,984 B1 | 8/2002 | Alex | 360/31 |
| 6,603,617 B1 * | 8/2003 | Cross | 360/31 |
| 6,700,723 B2 * | 3/2004 | Li | 360/53 |
| 2001/0043439 A1 * | 11/2001 | Ohwe et al. | 360/244.1 |
| 2002/0155322 A1 * | 10/2002 | Takahashi et al. | 428/694 T |

FOREIGN PATENT DOCUMENTS

| | | |
|---|---|---|
| EP | 0 623 929 | 11/1994 |
| EP | 000623929 A2 * | 11/1994 |
| EP | 0 860 827 | 8/1998 |
| GB | 2 302 982 | 2/1997 |
| WO | WO8906428 * | 7/1989 |
| WO | 993947 | 8/1999 |
| WO | 75865 | 10/2001 |
| WO | 047248 | 6/2003 |
| WO | WO03047248 A1 * | 6/2003 |

\* cited by examiner

CIRCUIT AND METHOD FOR REFRESHING DATA RECORDED AT A DENSITY SUFFICIENTLY HIGH TO UNDERGO THERMAL DEGRADATION

This application is a continuation of U.S. patent application Ser. No. 10/213,337 with filing date Aug. 5, 2002 (U.S. Pat. No. 6,628,466) which is in turn a continuation of U.S. patent application Ser. No. 09/369,646 filed Aug. 6, 1999 (U.S. Pat. No. 6,429,984).

BACKGROUND

A typical data storage system includes a magnetic medium (such as a disk or a tape) for storing data, and a transducer used to write and read data to and from the medium. Writing data to a disk generally involves passing a current through a write element of the transducer to produce magnetic lines of flux which magnetize a specific portion of the disk surface. Each magnetized portion normally covers a number (e.g., 100–1000) of grains. Reading data from a specified disk location is typically accomplished by a read element of the transducer sensing the magnetic flux lines emanating from magnetized portions of the disk. As the read element (that can include an inductive sensor, a magnetoresistive (MR) sensor, or a GMR sensor) passes over a disk's surface, interaction between the read element and magnetized portions of the disk's surface generates electrical signals, commonly referred to as readback signals.

Such readback signals can also contain errors that arise from, e.g. thermal asperities or baseline wander of the readback signal, and can be corrected by circuitry as described in U.S. Pat. No. 5,818,565. Furthermore, U.S. Pat. No. 5,530,705 describes a method for determining errors in data read from a transducer in a disk drive, correcting the errors in the data by use of error correction circuitry, maintaining a metric of the errors, and when the metric reaches a threshold, applying a toggle procedure to the transducer in an attempt to improve the transducer's performance. Moreover, if a head exhibits a low amplitude state, then the state can be changed to the normal (high amplitude) state by reversing the bias current as described in U.S. Pat. No. 5,661,614.

Western Digital Corporation's drives (such as WD Caviar AC310100 10.1 GB hard drive) have a feature entitled "Data Lifeguard" that automatically identifies and repairs sectors before data loss occurs, as described in, for example, "Failure Prevention and Data Protection Through Data Lifeguard," available at http://www.wdc.com. As described therein, the feature performs off-line scans of the disk while the hard drive is idle, and refreshes weak data. The feature initiates automatically every eight operating hours for daily protection, with the goal of performing one scan per day. Data Lifeguard's off-line scan identifies and repairs marginal sectors. When the off-line scan encounters an ECC Firmware Correctable Error, Data Lifeguard runs a Sector Test to determine if a media defect exists.

If a media defect exists, Data Lifeguard rewrites the corrected data back to the original sector, then rereads it to ensure that the sector is fixed. If the error recurs on reread, Data Lifeguard then relocates the sector to a spare pool and writes the corrected data to the spare sector. When the off-line scan encounters sectors that require extensive retries for error recovery, Data Lifeguard again performs the Sector Test. If the error still recurs on reread, Data Lifeguard then relocates the sector to the spare pool and writes the corrected data to the spare sector. Data Lifeguard also protects future data to be written to suspect sectors. When the off-line scan encounters an ECC Uncorrectable Error, Data Lifeguard updates the drive's internal defect list for the suspect sector. The next host write command to the suspect sector will perform a Sector Test after the write to ensure that the user data written is readable. If an error occurs during the reread, Data Lifeguard relocates the sector to the spare pool and writes the user data to the spare sector.

SUMMARY

An apparatus and method in accordance with the invention write data to a storage medium, e.g., a magnetic medium (such as a hard disk, a floppy disk, or a tape), and refresh the data prior to the occurrence of a non-recoverable error (also called "hard" error) in the data. Specifically, in one embodiment, the data is stored in an areal density that is sufficiently high to cause spontaneous degradation (e.g. loss in amplitude of a readback signal) of the data over time. Whenever necessary, the written data is read and used in the normal manner (although the amplitude of the readback signal reduces with time).

Subsequent to the writing of data and before a hard error occurs due to spontaneous degradation, the apparatus and method perform a "refresh" operation. In the refresh operation, the to-be-refreshed data is read from the storage medium and re-written (either on the same or different storage medium depending on the embodiment). Repeated performance of the refresh operation allows data to be stored for an indefinite period of time, and at densities sufficiently high to result in some degradation prior to each refresh operation, while avoiding a hard error.

In one implementation, the apparatus and method perform the refresh operation only on occurrence of a predetermined event, e.g. when an indicator (also called "refresh indicator") satisfies a predetermined condition, indicating that data needs to be refreshed (e.g., because the data is about to contain one or more recoverable errors, also called "soft" errors). Depending on the embodiment, the apparatus and method may save the refresh indicator contemporaneous with writing of the data. Alternatively, the refresh indicator can be built into the apparatus or method (e.g. hardcoded in software). Use of the refresh indicator eliminates the need to scan the hard disk (as required by, e.g. Data Lifeguard) to identify the to-be-refreshed data. Instead, use of the refresh indicator automatically identifies to-be-refreshed data, even before a hard error occurs, thereby to prevent data loss.

In one example, the apparatus and method read the data back contemporaneous with writing of the data, and measure an amplitude (or other property) of a readback signal, and store as the refresh indicator a predetermined fraction (e.g. half) of the measured value. In this example, the amplitude of the readback signal reduces over time, as the magnetization in the storage medium become disordered (e.g. due to thermal energy). When the current value of the amplitude falls below the stored value, the data is refreshed. The predetermined fraction is determined by testing the storage medium under realistic conditions until one or more soft errors (or a hard error in another implementation) occurs, followed by dividing the amplitude's value (at the time of error) with the amplitude's value at the time of writing.

In another embodiment, a duration (or a fraction thereof) for which the data can be read without error (also called "error-free duration") is added to the current date, to compute a date in future (also called "next refresh date" or simply "refresh date") when the data needs to be refreshed. The apparatus and method store the next refresh date as the refresh indicator. After the error-free duration, the refresh date becomes older than the current date, and the apparatus and method perform a refresh operation, and reset the refresh date.

Instead of using a refresh indicator, other techniques can be used in other implementations. For example, data can be refreshed periodically (e.g. once a day), regardless of the amount of degradation in the data (e.g. without performing an off-line scan). As another example, a refresh operation may be performed in response to a predetermined event, such as the detection of a soft error. Alternatively, two amplitudes may be compared, wherein a first amplitude is of the to-be-refreshed data, and a second amplitude is of a test signal that has just been written, thereby to determine if there is a loss of amplitude by a predetermined amount (and if so, a refresh operation is performed).

The refresh operation can be repeated any number of times, to maintain the data without irrecoverable loss for an indefinite time period, thereby to allow storage of data at densities that otherwise result in spontaneous loss of data over time. Specifically, data can be deliberately stored in grains having magnetization energy (defined to be $K_u V$ wherein $K_u$ is grain anisotropy and V is the grain volume) that is less than the energy normally used to ensure avoidance of spontaneous demagnetization by thermal energy. Such use allows the areal density (defined to be number of bits in a unit area) of the stored data to be increased significantly (e.g. by an order of magnitude), as compared to areal densities in the prior art. The areal density can be increased by decreasing the diameter of each grain or by decreasing the number of grains being used to hold a single bit of data, or both. The areal density can also be increased by storing adjacent bits closer to one another. Any such increase in areal density allows storage media (such as hard disks or tapes) to have increased data storage capacity, as compared to the prior art.

DETAILED DESCRIPTION

An apparatus and method in accordance with the invention write data to a magnetic storage medium in a sufficiently high density at which degradation in a readback signal of the data occurs spontaneously, and prior to a permanent loss of the data perform a refresh operation (e.g., read the data back and rewrite the data). Specifically, when data is written to a track in a disk (for example), groups of grains in the track have alternating polarity of magnetization (e.g. magnetization pointed to the "right" or to the "left") depending on the data being recorded (normally recorded in the form of "transitions" in polarity, wherein each transition denotes one or more bits of the data). In such a disk, the lowest energy state is a random one, wherein the grain polarities point in all directions (or in anti-parallel directions), with the average being zero. With passage of time, thermal energy causes grain polarity to become randomized if the recording density is sufficiently high (e.g. greater than a predetermined density), so that grains previously magnetized to point "left" (or "right") no longer point to the 'left" (or "right").

When a significant number of grains in a group (e.g. 50%) become randomized, the value of the readback signal obtained during reading of the data no longer represents the previously written data (i.e. an error occurs). A small number of such errors (also called "soft" errors) can be corrected by use of any error correction code of the type well known in the art of data storage and retrieval. However, after passage of additional time, the errors become too numerous to be corrected by use of the error correction code, resulting in a permanent loss of data (also called "hard" error). Prior to such a permanent loss of the data, the apparatus and method perform a refresh operation automatically (and preferably without scanning the entire storage medium as required by, e.g., Data Lifeguard).

Data, when refreshed repetitively as described herein, can be maintained indefinitely (without any hard errors being caused by spontaneous degradation due to thermal energy), although stored at a density greater than the predetermined density. Thus, the apparatus and method allow the size (height and diameter) of each grain, the number of grains, and/or the spacing between two adjacent magnetized portions (each portion containing a group of grains) to be made as small as desired, regardless of degradation due to thermal energy ($k_B T$ wherein $k_B$ is the Boltzmann's constant and T is absolute temperature), although limited by the frequency of the refresh operation. For example, in a magnetic medium of the type described herein, each magnetized portion may have only tens of grains (instead of hundreds of grains), the diameter of each grain can be reduced to 100 Å (or even a few tens of angstroms, e.g., 50 Å) and the nearest neighbor transition may be less than a few grain diameters away (e.g., 250 Å away) as long as the data is refreshed in a manner sufficient to prevent hard errors as described herein.

Therefore, the areal density of data being stored in the magnetic medium can be increased significantly over the prior art density, e.g. by an order of magnitude, while the amplitude of the readback signal degrades over time. In one example, data is stored at such a density that the degradation occurs in an asymptotic manner, e.g. with the energy ratio ($K_u V/k_B T$) below 50 (assuming room temperature operation). In this example, the grains size is assumed to be between 100 and 150 Å in diameter and 100 to 150 Å in height. Spontaneous degradation of the readback signal and eventual loss of data (of the type described herein) occurs, for example, when grain diameter is below 100 Å.

Figure 1:
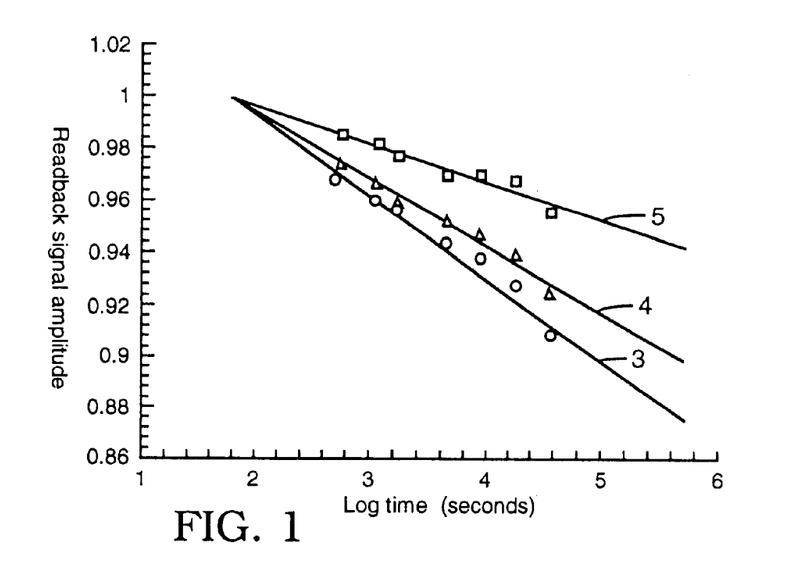
FIG. 1 illustrates, in graphs 3–5, decay in amplitude of readback signals (along the y axis) of data recorded at different linear densities (with graph 3 being for a higher linear density than graph 5) as a function of time (along the x axis) shown in values of log to base 10.

FIG. 1 illustrates degradation in readback signal amplitude as a function of time (e.g., as illustrated for graph 3, the readback signal amplitude falls to below 88% of the original amplitude before one year). In FIG. 1, each of graphs 3, 4, and 5 are for linear densities of 400, 300, and 200 kFCI (thousands of flux changes per inch) for operation at room temperature of, for example, 22° C. The corresponding frequencies for graphs 3–5 are 100, 75, and 50 MHz. Note that in this example, the grains are magnetized in the plane of the film (that may be used in the form of a disk or tape), also known as "longitudinal media". Depending on the implementation, the above-described energy ratio can be made to be less than 50 (e.g., can even be 40 depending on the measurement technique).

The energy ratio is a function of a number of parameters such as, magnetic anisotropy, film thickness, and temperature of operation. Specifically, as the film thickness is reduced, the volume of each grain is also reduced, and polarity of magnetic signals recorded in the grains becomes susceptible to degradation due to thermal energy at room temperature. Moreover, even when the grain size remains the same, recorded signals undergo increasing thermal degradation as the recording density is increased (e.g., by writing transitions closer together either by recording at higher frequencies than normal or by spinning the disk slower than normal). Over time, magnetizations of one or more grains included in a magnetic portion become disordered, resulting in a degradation in the amplitude of readback signal when reading data that was previously stored in the grains. Testing the storage medium under realistic conditions (e.g. at normal operating temperatures, such as in the range 22–80 C.°, and normal spacing between adjacent magnetizations, such as 100 nm) until a soft error occurs yields the readback signal's amplitude at the time of the error. Such testing can be used to select, as the refresh indicator, a value of the readback signal's amplitude at which a refresh operation is to be performed.

So, in one embodiment, the spacing between adjacent magnetized locations of the magnetic medium is kept small enough to ensure that the amplitude of a readback signal degrades spontaneously over time. For example, the spacing can be made smaller than 50 nm (for a recording density of 500 kFCI), so that interactions between fields in adjacent magnetized locations accelerates the degradation in the amplitude, as illustrated in FIG. 1 by lines 3–5 (wherein normalized signal amplitude is plotted along the y axis and time in logarithmic units is plotted along the x axis).

Figure 2:
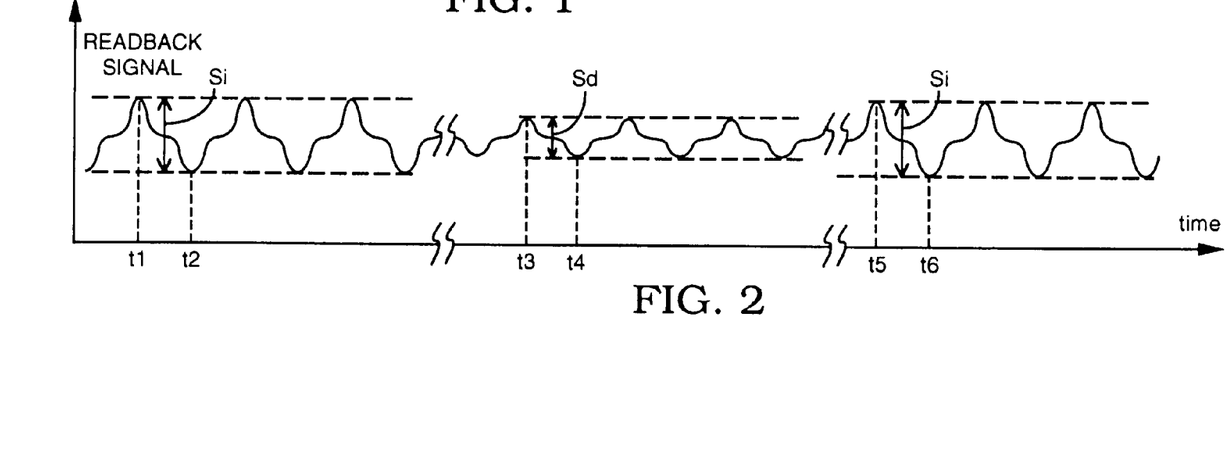
FIG. 2 illustrates, in a graph, amplitude of a readback signal at the time of writing the data, after operation for a significant time period, and also after data is refreshed in accordance with the invention.

In one embodiment, a refresh indicator is selected to ensure that data is refreshed when an amplitude Si of the readback signal at the time of writing (e.g. at time t1 as illustrated in FIG. 2) falls to a value Sd (e.g. at time t3) that is a predetermined fraction (e.g. one half) of the original amplitude. After a refresh operation, the readback signal's amplitude returns to the original value Si (e.g. at times t5 and t6 in FIG. 2).

In one example, a refresh indicator of value 0.5*Si is saved with the data. Thereafter, the refresh operation is performed when the apparatus and method finds that Sd≦0.5*Si. In another example, the refresh indicator is computed based on a duration (t3–t1) during which the amplitude degradation can occur without a hard error. Such an error-free duration (or a fraction thereof, e.g., 50% of the duration) is added to the date of writing the data to determine the refresh indicator. Thereafter, the refresh operation is performed automatically as soon as the date stored as the refresh indicator is found to be older than the current date.

Such apparatus and method eliminate the need to scan an entire hard disk to detect occurrence of an error during reading of the data. Instead, a refresh indicator is saved concurrent with writing of the data. Thereafter, the apparatus and method use the refresh indicator to determine if a data refresh needs to be performed. The refresh indicator can be any parameter that signals a need to refresh the data at some time prior to occurrence of a hard error.

In one embodiment, a computer 8 (FIG. 3) writes (e.g. as illustrated by act 10 in FIG. 4) data to a file (e.g. file 9I in FIG. 3 that is one of a number of files 9A–9N, A≦I≦N, N being the total number of files) in a storage medium, such as a hard disk 11 in a hard disk unit 12. Contemporaneous with (i.e. just before, during, or just after) writing of the data (e.g. within the same day), computer 8 also optionally saves (e.g. as illustrated by act 14 in FIG. 4) a refresh indicator (e.g. indicator 13I in FIG. 3) for later use in deciding on performance of the refresh operation. Thereafter, whenever necessary, computer 8 reads (e.g. as illustrated by act 15 in FIG. 4), and uses the written data in the normal manner.

Computer 8 is also programmed with software to automatically perform a refresh operation as illustrated by acts 16–19. Specifically, computer 8 waits (as illustrated by act 16 in FIG. 4) for an event (hereinafter "refresh check event") that may occur either periodically, or in response to a predetermined event, such as the detection of a soft error. In case of the predetermined event, computer 8 checks (as illustrated by act 17) if a previously-saved indicator 13I (also called "refresh indicator"; see FIG. 3) satisfies a predetermined condition indicating that data needs to be refreshed. If not, computer 8 returns to act 16 (described above).

Figure 4:
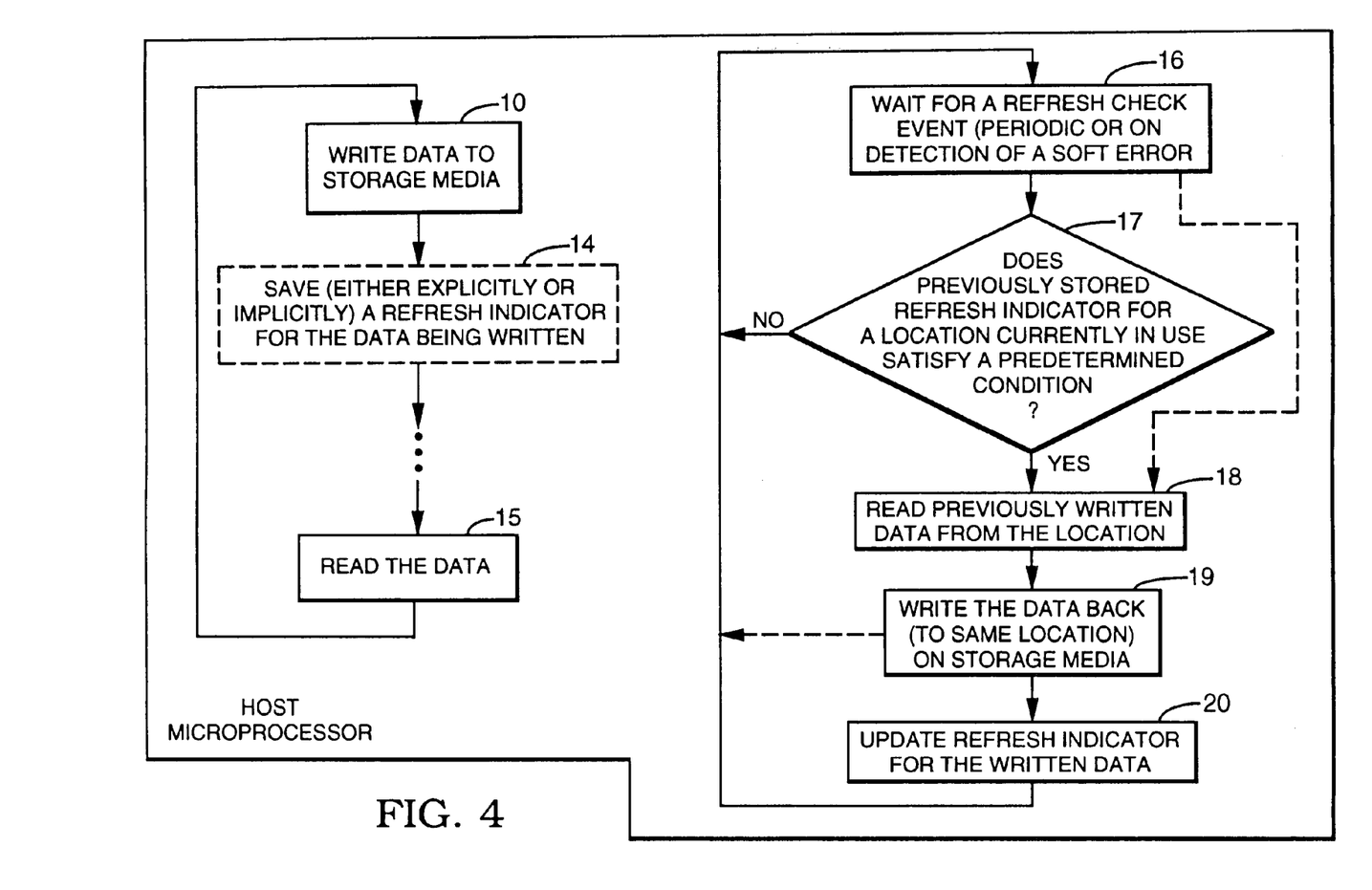
FIG. 4 illustrates, in a flow chart, acts performed by the computer of FIG. 3, for refreshing data prior to loss of the data.

If so, (and also in case of a periodic event) computer 8 performs a "refresh" operation, wherein the to-be-refreshed data is read from (as illustrated by act 18) and written back (as illustrated by act 19) to the same file 9I (in this embodiment; in an alternative embodiment, the data is written to a new file in hard disk 12 followed by deletion of the original file). Next, computer 8 updates (as illustrated by act 20) the refresh indicator for the data written in act 19. Then, computer 8 returns to act 16 to wait for another refresh check event. Computer 8 returns directly from act 19 to act 16 in case of a periodic event.

In this manner, the refresh operation (acts 18 and 19) can be repeated any number of times, to maintain the data without loss for an indefinite period, thereby to allow the use of a storage medium in a manner that causes the readback-signal to lose amplitude over a period of time. Such use allows the areal density of the stored data to be increased significantly (e.g. by an order of magnitude), as compared to areal densities in the prior art. The increase in areal density allows disk drives to have increased capacity, as compared to the prior art.

Note that in the acts described above in reference to FIG. 4, instead of hard disk unit 11 (FIG. 3), another storage unit, e.g. floppy disk unit 21, or tape unit 22 can be used (to store a file of data, or a refresh indicator, or both). Note also that such acts can be performed either by a processor (in firmware) that is located in the storage unit, or by microprocessor 23 (in software) that acts as the central processing unit of computer 8.

Figure 5:
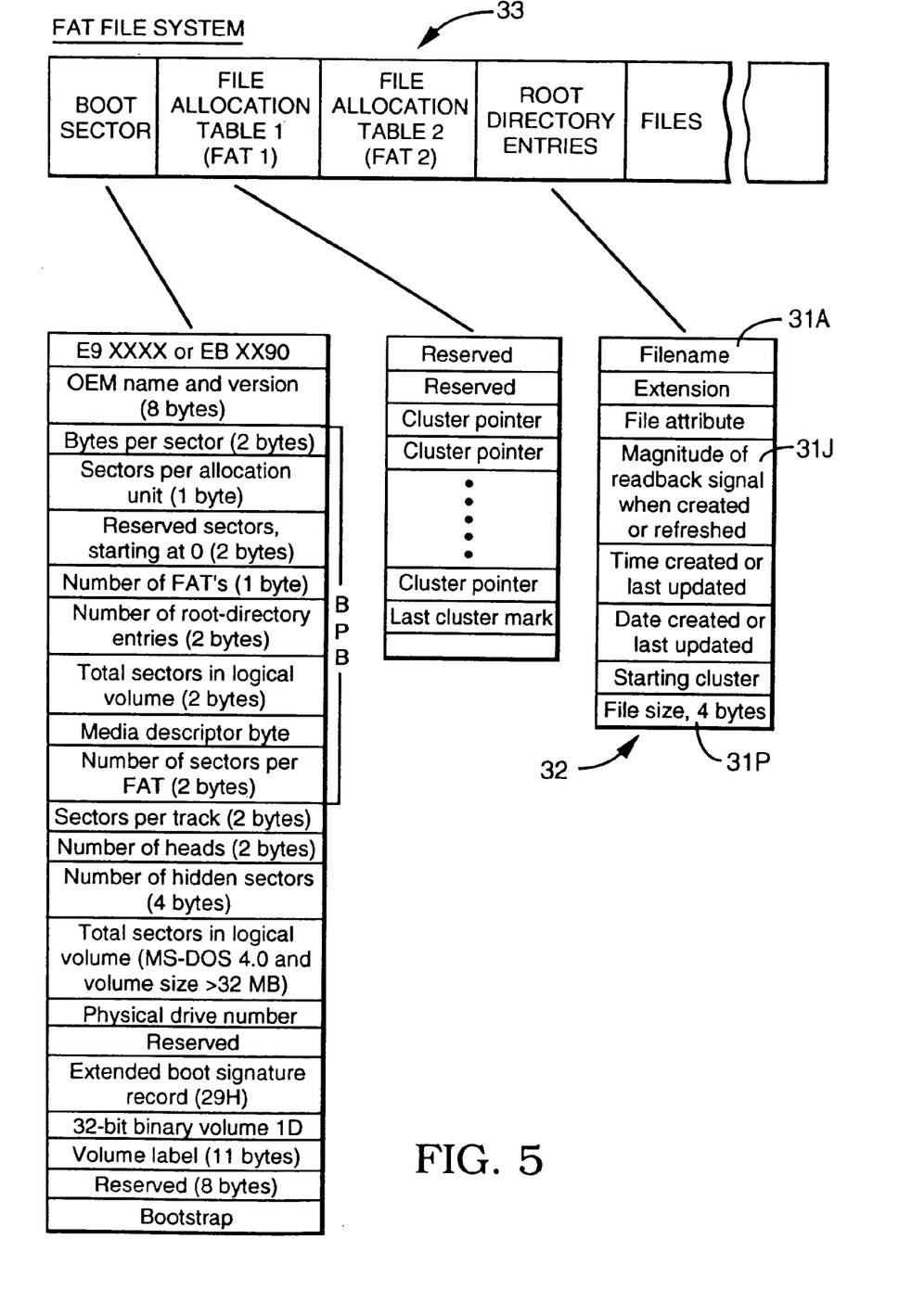
FIGS. 5 and 6 illustrate storage of a refresh indicator in two different file systems respectively.

In one example, computer 8 reads back data contemporaneous with writing of the data, and measures an amplitude (or other property) of the readback signal at the time of writing. Computer 8 then stores a predetermined fraction (e.g. half) of the measured value as the refresh indicator, e.g. in field 31J (FIG. 5) that is one of a number of fields 31A–31P, A≦J≦P, P being the total number of fields) in a directory entry 32 of a FAT file system 33. Thereafter, in act 17 (FIG. 4), computer 8 checks if the stored value of the readback signal's property is larger than a current value, and if so performs the refresh operation (see acts 18 and 19 in FIG. 4).

Figure 6:
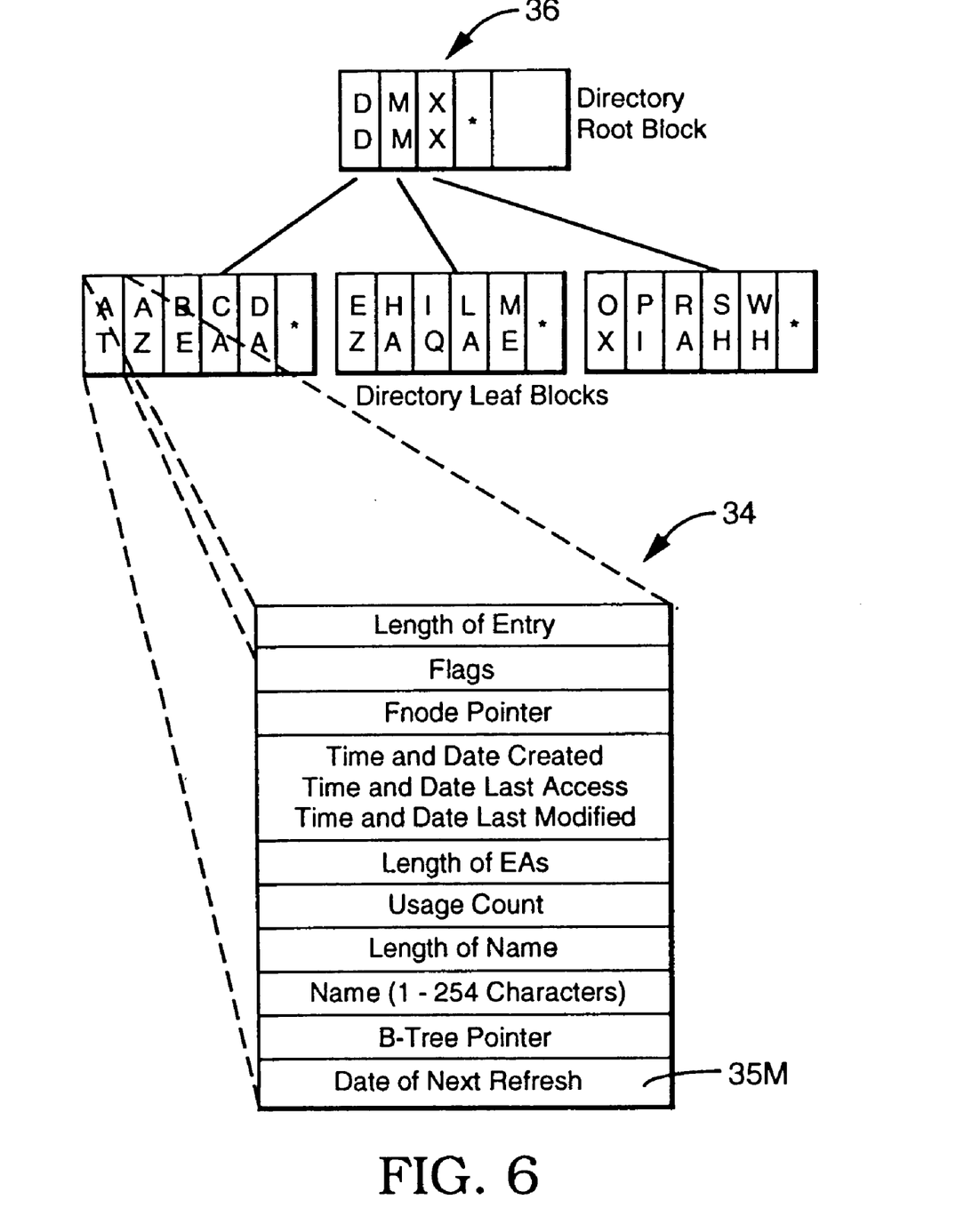

Note that other fields of directory entry 32 hold other file attributes, such as filename in field 31A, and file size in field 31P (as described in U.S. Pat. No. 5,363,487 entitled "Method and System for Dynamic Volume Tracking in an Installable File System" issued to Willman et. al. on Nov. 8, 1994 that is incorporated by reference herein in its entirety). Instead of the FAT file system 33 and directory entry 32 of FIG. 5, another file system 36 and directory entry 34 as illustrated in FIG. 6 can hold the refresh indicator (e.g. a date of next refresh is stored in field 35M).

As described briefly above, in another example, contemporaneous with the writing of data, computer 8 adds an error-free duration (or a fraction thereof) to the current date to compute a date in future (also called "refresh date") when the data needs to be refreshed, and saves the refresh date (as illustrated by act 14 in FIG. 4) as the refresh indicator. In this example, computer 8 determines (see act 17 in FIG. 4) if the refresh date is older than a current date, and if so performs the refresh operation and resets the refresh date.

In one embodiment, the duration between two refresh operations is related to the rate of loss of the readback signal's amplitude (that, in turn, depends on the areal density of the data being recorded). In this embodiment, performance of refresh operation takes less time than the amount of time for which the storage medium is not used for normal operations (defined to be operations other than the refresh operation). Therefore, if a hard disk is not used for 50% of a given time period (e.g., hour or day), the refresh operation takes less than 50% so that the refresh operation is successfully completed.

Note that if the refresh operation takes longer than the time available between normal operations, either (a) the normal operations are postponed or performed at a low priority, or (b) the refresh operation is not completed (possibly resulting in non-recoverable errors). Non-recoverable errors can be avoided by limiting areal density to be less than a predetermined amount (e.g., 600 kFCI) that may be found to be sufficient to allow the refresh operation to complete while also performing normal operations (during the given time period).

In one embodiment described above, a single refresh indicator is saved for all the data that is stored in a single file. However, in other embodiments, instead of storing a refresh indicator for each file, a refresh indicator can be stored for each track. Note that instead of a refresh date, a "last modified" date that is normally maintained by the operating system for each file can be used to determine the need for a refresh operation.

In one embodiment, storage unit 11 (FIG. 7) includes a read-write circuit 41 that receives the data being read from a sector 48 of disk 12 via a read-write amplifier 42 and read channel 44. Amplifier 42 amplifies the signal from head 43 ten times (or hundred times depending on the implementation). Read channel 44 can be implemented by any well known circuit, such as a peak detector, a circuit using the Partial Response Maximum Likelihood technique, also called "PRML circuit" or a circuit using Decision Feedback Equalization technique, also called "DFE circuit". PRML circuits are described in, for example, the book entitled "PRML: A Practical Approach, Introduction to PRML Concepts and Measurements" by Alexander Taratorin, published 1995 by Guzik Technical Enterprises, 4620 Fortran Drive, San Jose, Calif. 95134, that is incorporated by reference herein in its entirety.

Figure 8:
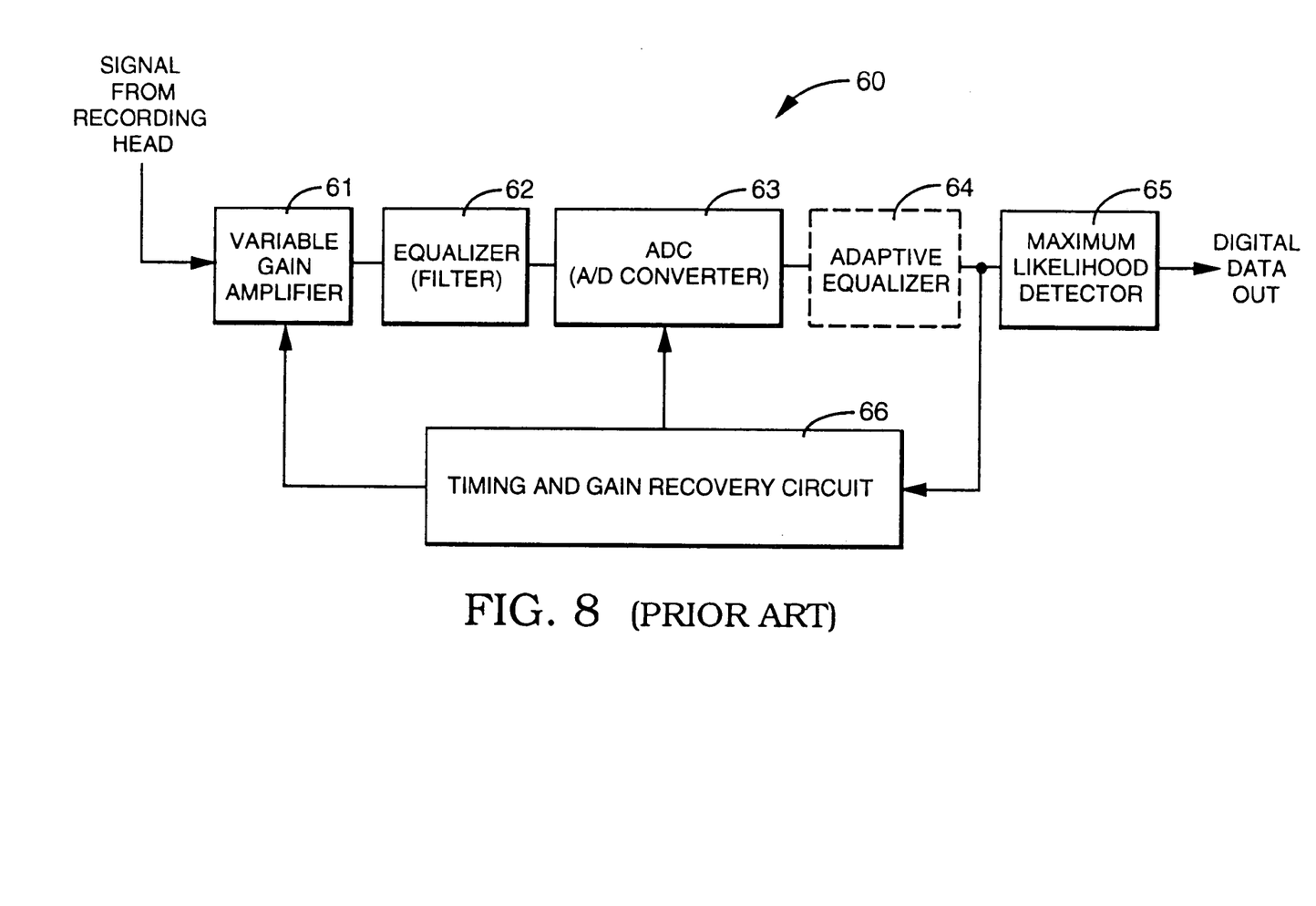
FIG. 8 illustrates, in a block diagram, a prior art PRML circuit for use as a readback channel 44 in storage device 11 of FIG. 7.

A prior art PRML system 60 includes a variable gain amplifier 61 having an output port coupled to an equalizer 62 that in turn has an output port coupled to an A/D converter 63 that in turn has an output port coupled via an adaptive equalizer 64 to a maximum likelihood detector (also called "sequence" detector) 65. Detector 65 decodes the input data pattern by selecting the pattern which most probably could create the observed output of A/D converter 63. The output of A/D converter 63 is also used as a feedback signal for the timing and gain recovery circuit 66 which sets the system gain and keeps clock phase at the proper position.

The output of detector 65 is supplied via an output bus 440 to a read-write circuit 41 that includes a buffer memory 41M coupled to an interface controller 41C. Interface controller 41C temporarily stores the output of detector 65 in buffer memory 41M. Controller 41C also converts the output from bus 440 into a format required by a personal computer, e.g. one of formats ATA, IDE, SCSI and DMA. Therefore, controller 41C supplies the converted signal on a system bus 47 of a personal computer (not shown).

Figure 7:
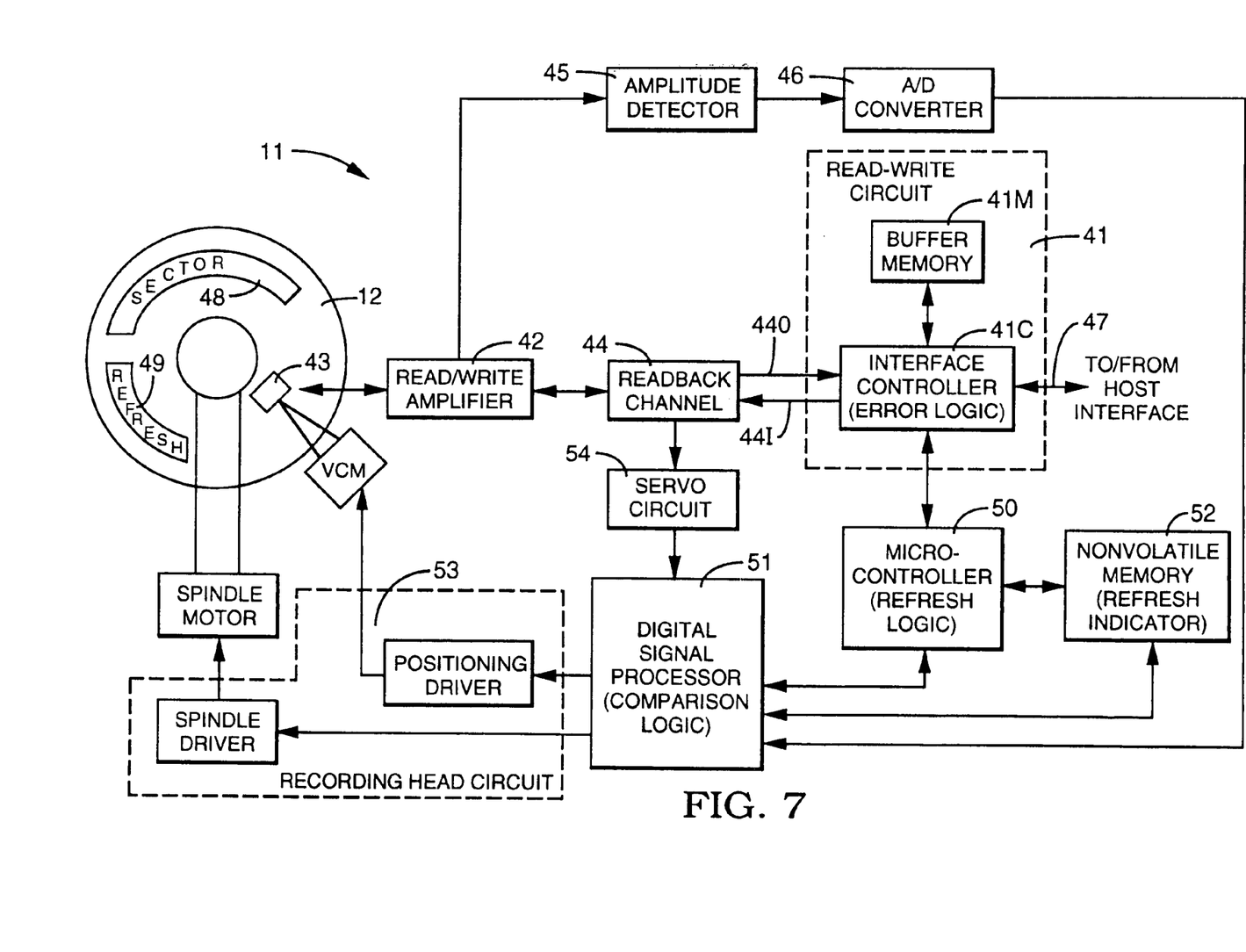
FIGS. 7 and 9 illustrate, in high level block diagrams, use of an amplitude detector for the measurement of amplitude which is used as a refresh indicator in one specific embodiment.

Controller 41C also includes an error logic that checks for any errors in the data from bus 440, and if an error is found, corrects the error, if necessary by re-reading the data via head 43. Note that each of items 41–44 is a prior art item, and functions in the conventional manner. Storage unit 11 also includes a microcontroller 50 that responds to errors detected by controller 41C, e.g. by instructing controller 41C to re-write the error-corrected data from buffer memory 41M to disk 12. In addition to microcontroller 50, storage unit 11 includes a digital signal processor (DSP) 51 that compares the amplitude of the readback signal with a predetermined refresh indicator (held in non-volatile memory 52 when the drive is assembled or as indicator 49 on disk 12). Note that the refresh indicator can be saved at the factory when the drive is assembled, or alternatively at the time data is first written to a sector 48.

DSP 51 indicates to microcontroller 50 the need to perform a refresh operation (by re-writing the data to disk 12) when the predetermined condition is satisfied (as described herein). DSP 51 receives the readback signal's amplitude from an A/D converter 46 that in turn receives an analog signal from an amplitude detector 45 that in turn receives the readback signal from read/write amplifier 42 (described above). Note that amplitude detector 45 is different from a peak detector that merely finds the location of a peak in time and does not record the amplitude. Instead, amplitude detector 45 can be any conventional circuit that detects and records the maximum amplitude as the signal decays, e.g. a Norton detector as described on page 543 of Chapter 11 (incorporated by reference herein) of the book entitled "McGraw-Hill Circuit Encyclopedia and Troubleshooting Guide," vol. 2 by John D. Lenk, published by McGraw Hill, Inc. in 1994.

Amplitude detectors can also be formed by a diode and a capacitor or by a feedback loop using amplifiers in addition to the diode-capacitor combination, as described in, for example, pages 217–219 (incorporated by reference herein) of the book entitled "The Art of Electronics," Second Edition, by Paul Horowitz and Winfield Hill, published 1989 by Cambridge University Press. A/D converter 46 can also be any prior art device, such as a parallel encoder and successive approximation as described in, for example, pages 621–626 (incorporated by reference herein) of the just-described book by Paul Horowitz et al.

Note that instead of an amplitude detector 45, any other type of amplitude detector (e.g., a device that finds the root mean square (RMS) amplitude or one that finds a percentage of the peak amplitude) can be used in other embodiments. In one embodiment, the components listed in the following table are used to form the circuitry illustrated in FIGS. 7 and 8.

| Reference numeral | Part number |
| --- | --- |
| Recording Head Circuit 53 | SSI 32H6825A |
| Preamp 42 | SSI 32R1560R/61R |
| Servo Circuit 54 | SSI 32H6521 |
| Read Channel 44 | SSI 32P4910A |
| Interface Controller 41C | SSI 32C9210 |

All parts in the above table are available from Silicon Systems, Inc. of Tustin, Calif. (see their web page at http://www.ssil.com). Note that interface controller 41C has a port coupled to a microcontroller 50, thereby to allow microcontroller 50 to change signals within interface controller 41C (e.g. to cause controller 41C to write to sector 48 the signal obtained by error-correction of a readback signal).

Figure 9:
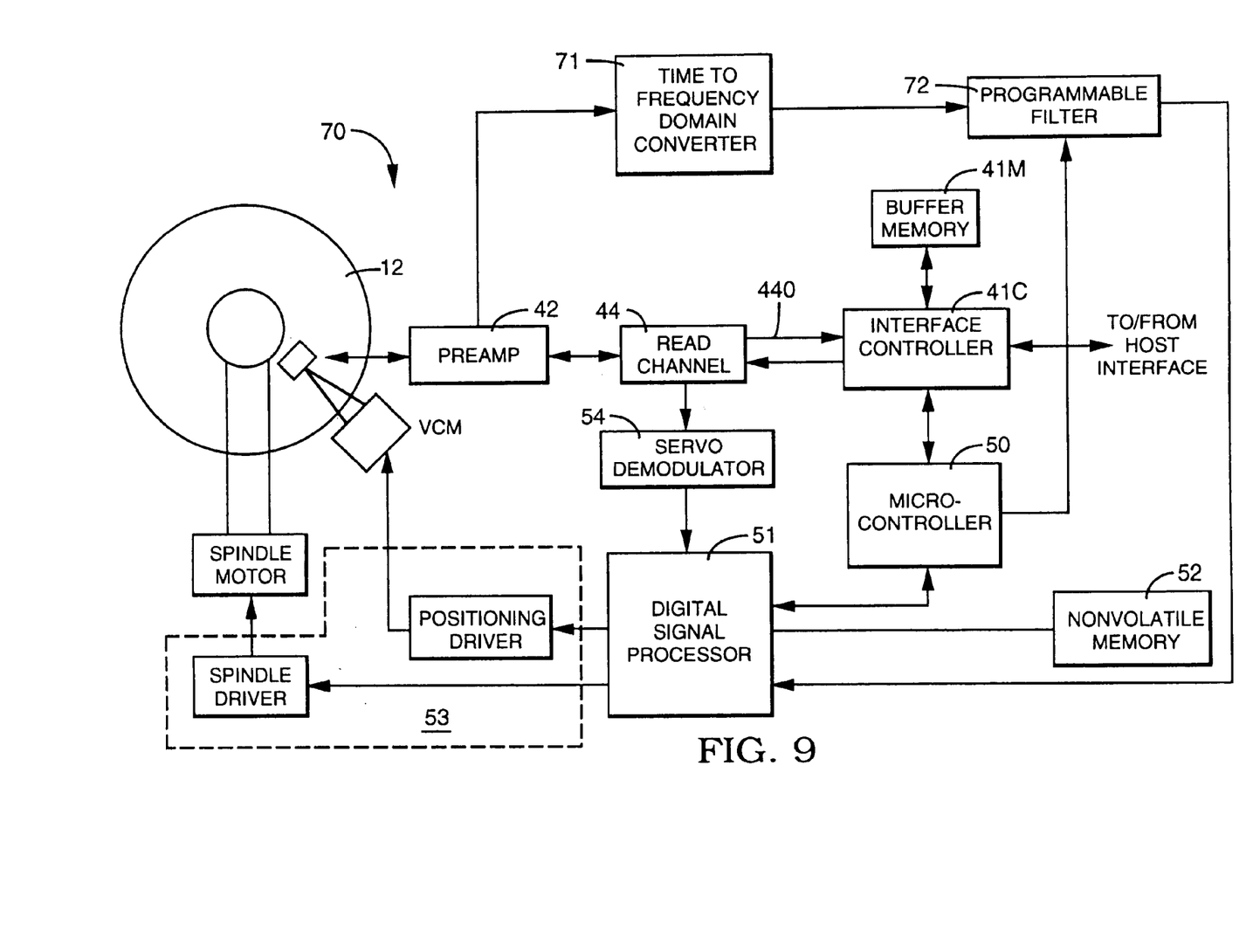

In another embodiment, storage unit 70 (FIG. 9) is similar to storage unit 11 (described above in reference to FIG. 7), except that instead of amplitude detector 45 and A/D converter 46, storage unit 70 includes a time-to-frequency converter (such as a fast Fourier transform (FFT) circuit) 71 and a programmable filter 72. Converter 71 can be implemented in any DSP to convert the analog signal from the time domain to the frequency domain. Thereafter, filter 72 eliminates all signals other than the signal of a predetermined frequency. Filter 72 can be implemented as a band pass filter that passes only a specific frequency component (e.g. at 100 MHz) of the readback signal to DSP 51. The predetermined frequency used by filter 72 can be programmable, and supplied by, for example, microcontroller 50. Note that DSP 51 of this embodiment implements an amplitude detector for detecting the amplitude of the high-frequency component. Furthermore, DSP 51 also compares the predetermined refresh indicator with amplitude of the readback signal's component at the predetermined frequency (instead of the amplitude of the entire readback signal). This embodiment takes advantage of greater resolution obtained from faster degradation in the amplitude of a high frequency component, as compared to decay of the readback signal's amplitude (as a whole across all frequencies).

Figure 3:
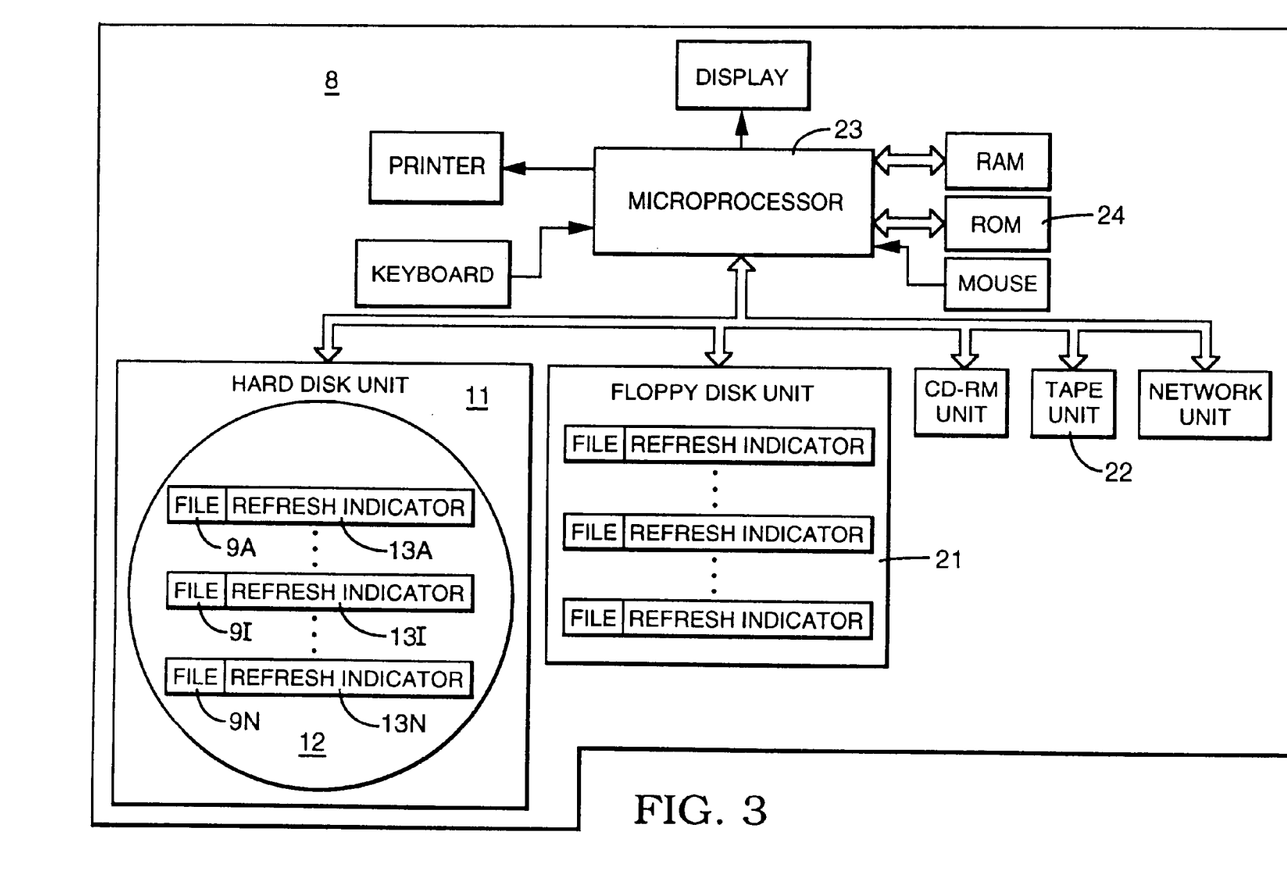
FIG. 3 illustrates, in a high level block diagram, various components included in a computer in one specific embodiment of the invention.

One advantage of an amplitude based implementation (of the type illustrated in FIGS. 7 and 9) is that storage device 11 automatically and independently ensures that integrity of the data is maintained, without involving any external circuitry (e.g., without using microprocessor 23 of computer 8 illustrated in FIG. 3), thereby to maintain backward compatibility with the rest of computer 8.

On the other hand, an implementation based on use of a refresh-date and error-free duration (e.g. as illustrated in FIG. 6) can be performed wholly inside microprocessor 23, without any changes to storage device 11. In such an implementation, a user having computer 8 merely loads (e.g. via a network unit connected to the Internet) a utility software (for acts illustrated in FIG. 4), and causes execution of the utility software by microprocessor 23 (i.e. no hardware changes are required in this implementation). Such a utility software allows use of a pre-existing disk drive at an operating temperature that is otherwise high enough to cause degradation of previously stored data over time. For example, computer 8 of the type described above, may be operated (while using such a software utility) at elevated temperatures found in, for example, a steel plant or a battle tank, without loss of data (from the hard drive) due to thermal energy.

Figure 10:
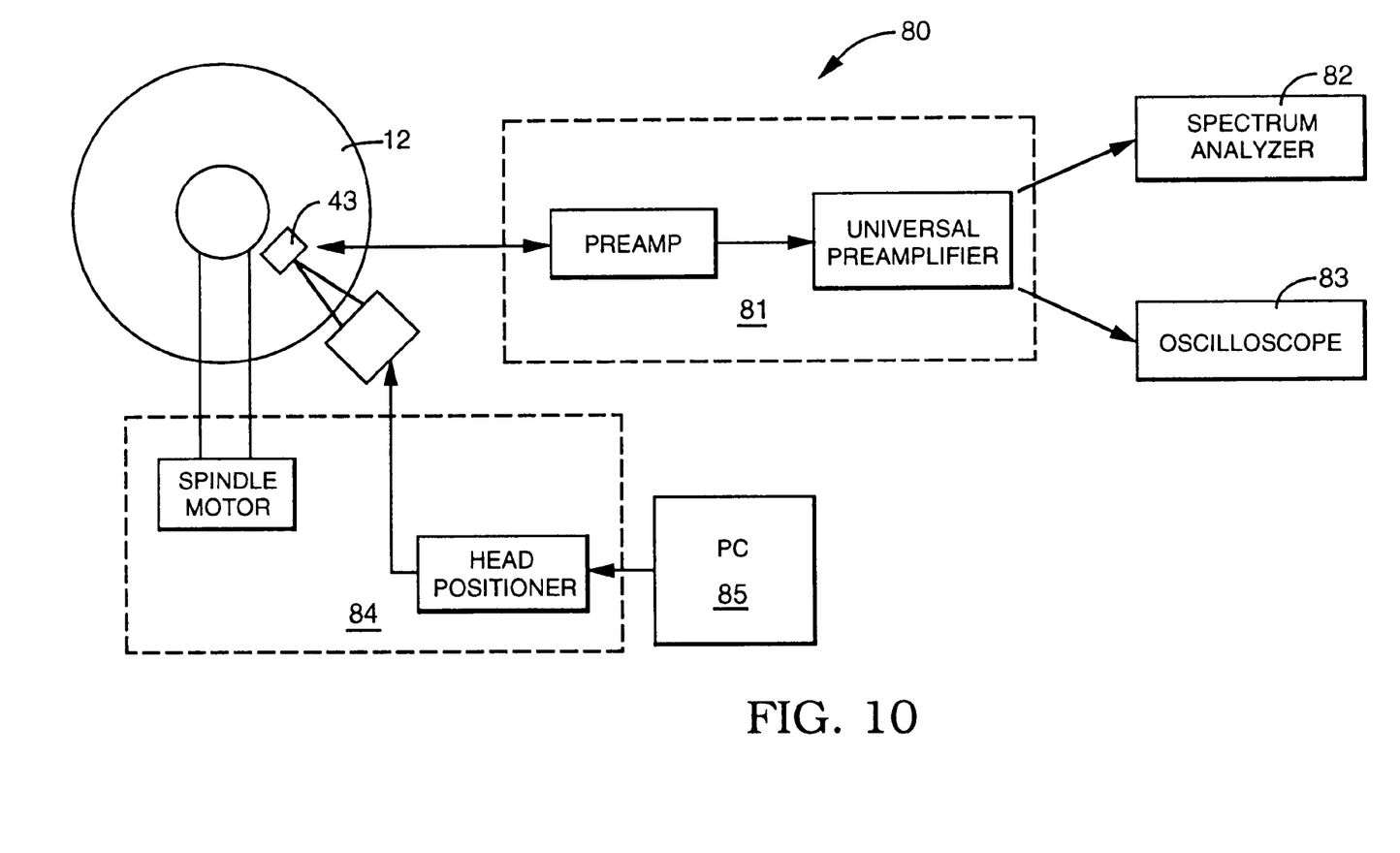
FIG. 10 illustrates circuitry for use in generating graphs 3–5 that are illustrated in FIG. 1.

FIG. 10 illustrates a test circuit 80 used to obtain the data illustrated in FIG. 1. Specifically, test circuit 80 includes a read-write analyzer 81 that supplies a signal to head 43 and that receives a readback signal from head 43. Analyzer 81 supplies the readback signal (which is undergoing decay) to each of a spectrum analyzer 82 and an oscilloscope 83. Spectrum analyzer 82 and oscilloscope 83 are used by a user to manually detect the change in the readback signal in the frequency and time domains respectively. A PC 85 is appropriately programmed, with software called "Wite" (abbreviation of "Windows Integrated Test Environment") available from Guzik, to enable the user to control the location on disk 12 where the data is written, the amplitude of the read and write signals, the frequency of the write signal, the recording density, the radius of the track being tested, the revolutions per minute (rpm) of the disk, whether or not the track was erased prior to writing the signal of interest and whether the readback signal of the track was electronically filtered during reading.

Test circuitry illustrated in FIG. 10 can be formed with the components listed in the following table.

| Reference numeral | Part number |
| --- | --- |
| Read-write analyzer 81 | Guzik RWA 1632 |
| Spinstand 84 | Guzik S-1701MP |
| Spectrum Analyzer 82 | Hewlett Packard HP8565B |
| Oscilloscope 83 | LeCroy 9370 (digitizing oscilloscope) |
| Personal Computer 85 | Dell Computers PC |

Numerous modifications and adaptations of the embodiments described herein would be apparent to the skilled artisan in view of the disclosure. For example, the refresh indicator can be stored in a file that has the same name as the file holding the data, but a different file extension (e.g. ".DEC" for decay). Such a file can be stored in the same disk or in a different disk. Also, a first portion of the storage medium may be used to record data at a lower density than a second portion of the storage medium, with critical information (such as a refresh indicator) being stored in the first portion (so that the critical information never degrades over time).

Also, refresh indicators for all files on a disk 12 can be held in a single file (e.g. a file with name "ALLFILES-.DEC") on the same disk 12, e.g. in a list of pairs, wherein each pair includes a file name and the corresponding refresh indicator. Alternatively, a similar list can be maintained in a programmable read-only-memory 24 (FIG. 3) that is unrelated to disk 12, and in this list each file name also includes a drive letter to identify the corresponding disk 12

As another example, it is not necessary to store the refresh indicator as the magnitude (of the readback signal) at which the refresh operation should be performed. Instead, computer 8 can simply write test data at the current time to an unused portion of the storage medium, and measure the amplitude of the readback signal of the test data. Computer 8 can then determine the difference between the measured value (of the test data amplitude) and the amplitude of the readback signal of the previously stored data, and if the difference is greater than a predetermined amount (or predetermined percentage) that is hardcoded in software, the refresh operation can be performed. The advantage of this example is that memory (e.g. in a directory entry) is not required for storage of the refresh indicator.

Note that instead of storing a refresh date, the date the data is written can be stored, and a difference between the stored date and the current date indicates an "age" of the stored data, and the age can be compared with a predetermined error-free duration to determine whether a refresh operation is to be performed.

In one embodiment, the occurrence of one soft error (during testing) to select the predetermined condition (e.g. an amplitude difference or error-free duration) for triggering the refresh operation. In other embodiments, occurrence of a predetermined number of soft errors (during testing) can be used to select the predetermined condition. The predetermined number of soft errors can be selected to be less than or equal to the number that can be corrected by an error-correction code normally used while reading the data.

Furthermore, one or more methods and circuitry described herein can be used in combination with each other, or in combination structure or acts of the prior art. For example, in another embodiment, two refresh indicators are used: when a predetermined condition based on the refresh date is satisfied, then a predetermined condition based on the amplitude is checked, and only when both conditions are satisfied the refresh operation is performed. Alternatively, a refresh operation can be performed when either of the just-described two predetermined conditions is satisfied. Moreover, in another embodiment, when either of the two predetermined conditions is satisfied, an off-line scan is performed and the refresh operation is performed only when a predetermined number of soft errors are found during the scan.

Also, in still another embodiment, act 17 in FIG. 4 is skipped and a refresh operation is automatically performed on a schedule, e.g., periodically for all the data in a hard disk wherein the period is derived from tests indicating a predetermined degradation in the readback signal (e.g., amplitude falls by more than 10% or one soft error occurs). In one example of such an embodiment, all data in the hard disk (irrespective of its degradation) is automatically refreshed every day (e.g., at 2 AM) or every week (e.g. on Sunday), thereby to ensure that the readback signal weakens by no more than a predetermined percentage (e.g., 10%) before the next refresh operation. Note that instead of performing a refresh operation at fixed times, the refresh operation can be performed at intervals of random duration within a predetermined range (e.g., between one to two days).

In yet another embodiment, instead of using soft errors to determine that predetermined condition, another parameter, such as the occurrence of one or more hard errors (or the loss of a predetermined percentage of signal amplitude) is used to determine the predetermined condition. Also, depending on the embodiment, the magnetic media can be either "longitudinal" media or "perpendicular" media.

Numerous such modifications and adaptations of the embodiments described herein are encompassed by the attached claims.

The invention claimed is:

1. A method for storing data on a storage medium comprising a magnetic disk, the method comprising:
   writing the data to the storage medium in which the spacing between adjacent magnetized locations of the magnetic disk is smaller than 50 nm whereby the data for a recording density is written at greater than 500 kFCI (19685 kFCm) so as to cause spontaneous degradation of the data over time;
   automatically reading the data periodically;
   generating a refresh indicator and checking if the refresh indicator satisfies a predetermined condition related to degradation of the data over time; and
   writing the data a second time at least in response to said predetermined condition being satisfied;
   wherein the data is written to the storage medium with an energy ratio below 50 KuV/KBT at room temperature.

2. A method according to claim 1 further comprising:
   writing the data to the storage medium with a grain diameter below 100 Å.

3. A method according to claim 1 wherein said predetermined condition is selected by estimating an expected time to occurrence of a hard error by any one or more of the steps of (a) empirically determining the duration of operation without errors on a disk during testing, and using this error free duration to generate and store a refresh date, (b) determining the occurrence of a predetermined number of soft errors.

4. A method according to claim 1 wherein:
   at least a portion of the data is written to a group of grains in a track of the magnetic disk at a density sufficiently high to cause a change in direction of magnetization of at least some of the grains with passage of said time.

5. A method according to claim 4 comprising using at least two refresh indicators to write at least the portion of data a second time.

6. The method of claim 1 further comprising writing the refresh indicator to a location in the storage medium distinct from another location used to write data.

7. The method of claim 6 further comprising using a date of performance of said "writing the data to the storage medium" to determine the refresh indicator.

8. The method of claim 7 wherein:
   said using includes setting the refresh indicator to be said date; and
   said predetermined condition is satisfied when said refresh indicator is older than a current date by a predetermined time period.

9. The method of claim 7 wherein:
   said using includes setting the refresh indicator to be a refresh date obtained by adding a predetermined time period to said date; and
   said predetermined condition is satisfied when said refresh date is older than a current date.

10. The method of claim 1 further comprising:
    determining, subsequent to said writing the data to the storage medium, a difference between a first value of the refresh indicator determined contemporaneous with said writing and a second value of the refresh indicator determined at a current time;
    wherein said predetermined condition is satisfied when said difference is greater than a predetermined limit.

11. The method of claim 1 further comprising using an amplitude of a readback signal of the data as the refresh indicator.

12. The method of claim 11 wherein said amplitude is hereinafter "first amplitude" and the method further comprises:
    writing the first amplitude to a location in the storage medium distinct from another location used to write the data;
    measuring a second amplitude of the readback signal contemporaneous with said checking; and said checking includes determining a difference between the second amplitude and the first amplitude.

13. The method of claim 12 wherein said checking further comprises comparing said difference with a predetermined limit.

14. The method of claim 13 wherein said checking further comprises comparing a percentage value of said difference with a predetermined percentage.

15. The method of claim 1 wherein the checking is performed periodically without scanning the entire storage medium.

16. The method of claim 1 wherein the refresh indicator is saved contemporaneous with said writing.

17. The method of claim 1 wherein said "automatically reading the data" and said "writing the data a second time" are both performed periodically.

18. The method of claim 1 wherein said "automatically reading the data" and said "writing the data a second time" are both performed on a schedule for all the data.

19. The method of claim 18 wherein said schedule is periodic.

20. A storage medium comprising:
a disk carrying data and having at least one property selected from a group of properties consisting of (a) spacing between adjacent magnetised locations of the disk less than 50 nm (b) recording density for data greater than 500 kFCI (19685 kFCm) (c) grain diameter less than 100 Å and (d) energy ratio less than 50 KuV/KBT so as to cause spontaneous degradation over time;
wherein the disk carries a refresh indicator that indicates a predetermined condition related to degradation of the data over time;
wherein the data is held in a file and the refresh indicator is stored as an attribute of the file.

21. The storage medium of claim 20 wherein the attribute is stored in a directory entry of a file system.

22. The storage medium of claim 20 wherein the refresh indicator is based on a time when the data were most recently written.

23. The storage medium of claim 20 wherein the refresh indicator is based on an amplitude of a readback signal of the data at the time of writing the data.

24. The storage medium of claim 20 wherein the data is held as polarity of magnetized portion of the storage medium.

25. The storage medium of claim 20 wherein the disk carries the refresh indicator at a location distinct from another location carrying the data.

26. The storage medium of claim 20 wherein the refresh indicator is stored in the disk at a lower density than the data.

27. A method for storing information on a magnetic disk, the method comprising:
writing the information to the magnetic disk, at least a portion of the information being written to a group of grains in a track at a density sufficiently high to cause a change in direction of magnetization of at least some of the grains with passage of a year; and
automatically refreshing at least the portion of information, using a refresh indicator;
wherein a transition in polarity between neighboring magnetized portions is less than 250 Å.

28. The method of claim 27 wherein:
the refresh indicator is stored on the magnetic disk at a lower density than the portion of the information.

29. The method of claim 27 further comprising using an amplitude of a readback signal of the information as the refresh indicator.

30. The method of claim 27 further comprising writing the refresh indicator to a location in the magnetic disk distinct from another location used to write the portion of the information.

31. The method of claim 27 wherein the refresh indicator is based on a time when at least a portion of the information was most recently written.

32. The method of claim 27 wherein the portion of the information is written to the magnetic disk with a grain diameter below 100 Å.

33. A method for storing information on a magnetic disk, the method comprising:
writing the information to the magnetic disk, at least a portion of the information being written to a group of grains in a track at a density sufficiently high to cause a change in direction of magnetization of at least some of the grains with passage of a year; and
automatically refreshing at least the portion of information, in response to detection
that the information in the magnetic disk contains a soft error.

34. The method of claim 33 wherein:
the refresh indicator is stored on the magnetic disk at a lower density than the portion of the information.

35. The method of claim 33 further comprising using an amplitude of a readback signal of the information as the refresh indicator.

36. The method of claim 33 further comprising writing the refresh indicator to a location in the magnetic disk distinct from another location used to write the portion of the information.

37. The method of claim 33 wherein the refresh indicator is based on a time when at least a portion of the information was most recently written.

38. The method of claim 33 wherein the portion of the information is written to the magnetic disk with a grain diameter below 100 Å.

39. A method for storing information on a magnetic disk, the method comprising:
writing the information to the magnetic disk, at least a portion of the information being written to a group of grains in a track at a density sufficiently high to cause a change in direction of magnetization of at least some of the grains with passage of a year; and
automatically refreshing at least the portion of information, using at least two refresh indicators;
wherein at least one of the refresh indicators is related to a high-frequency component of a readback signal.

40. The method of claim 39 further comprising writing at least one of the refresh indicators to a location in the magnetic disk distinct from another location used to write the portion of the information.

41. The method of claim 39 wherein the portion of the information is written to the magnetic disk with a grain diameter below 100 Å.

42. A method for storing information on a magnetic disk, the method comprising:
writing the information to the magnetic disk, at least a portion of the information being written to a group of grains in a track at a density sufficiently high to cause a change in direction of magnetization of at least some of the grains with passage of a year; and
automatically refreshing at least the portion of information, using at least two refresh indicators;

wherein at least one of the refresh indicators is related to a number of errors.

43. The method of claim 42 further comprising writing at least one of the refresh indicators to a location in the magnetic disk distinct from another location used to write the portion of the information.

44. The method of claim 42 wherein the portion of the information is written to the magnetic disk with a grain diameter below 100 Å.

45. A method for storing data on a storage medium comprising a magnetic disk, the method comprising:
    writing the data to the storage medium in which the spacing between adjacent magnetized locations of the magnetic disk is smaller than 50 nm whereby the data for a recording density is written at greater than 500 kFCI (19685 kFCm) so as to cause spontaneous degradation of the data over time;
    automatically reading the data periodically;
    generating a refresh indicator and checking if the refresh indicator satisfies a predetermined condition related to degradation of the data over time; and
    writing the data a second time at least in response to said predetermined condition being satisfied;
    wherein the refresh indicator is stored on the storage medium at a lower density than the data.

46. The method of claim 45 further comprising writing the refresh indicator to a location in the storage medium distinct from another location used to write data.

47. The method of claim 45 wherein the refresh indicator is based on a time when the data was most recently written.

48. The method of claim 45 wherein the data is written to the storage medium with a grain diameter below 100 Å.

49. The method of claim 45 further comprising using an amplitude of a readback signal of the data as the refresh indicator.

50. A method for storing information on a magnetic disk, the method comprising:
    writing the information to the magnetic disk, at least a portion of the information being written to a group of grains in a track at a density sufficiently high to cause a change in direction of magnetization of at least some of the grains with passage of a year; and
    automatically refreshing at least the portion of information, using a refresh indicator;
    wherein the refresh indicator satisfies a predetermined condition; and
    wherein the refresh indicator is stored on the magnetic disk at a lower density than the portion of the information.

51. The method of claim 50 further comprising using an amplitude of a read back signal of the information as the refresh indicator.

52. The method of claim 50 further comprising writing the refresh indicator to a location in the magnetic disk distinct from another location used to write the portion of the information.

53. The method of claim 50 wherein the refresh indicator is based on a time when at least a portion of the information was most recently written.

54. The method of claim 50 wherein the portion of the information is written to the magnetic disk with a grain diameter below 100 Å.

55. A method for storing information on a magnetic disk, the method comprising:
    writing the information to the magnetic disk, at least a portion of the information being written to a group of grains in a track at a density sufficiently high to cause a change in direction of magnetization of at least some of the grains with passage of a year; and
    automatically refreshing at least the portion of information, using a refresh indicator;
    wherein the diameter of at least one grain in the group of grains is less than 100 angstroms; and
    wherein the refresh indicator is stored on the magnetic disk at a lower density than the portion of the information.

56. The method of claim 55 further comprising using an amplitude of a readback signal of the information as the refresh indicator.

57. The method of claim 55 wherein the portion of the information is written to the magnetic disk with a grain diameter below 100 Å.

58. A storage medium embedded with computer instructions comprising instructions for:
    writing data to a magnetic medium wherein the spacing between adjacent magnetised locations of the medium is smaller than 50 nm and the recording density is greater than 500 kFCI (19685 kFCm); and
    automatically reading the data and writing the data back to the magnetic medium without scanning the magnetic medium;
    wherein during each writing the data are recorded at a density sufficiently high to spontaneously undergo thermal degradation with passage of time;
    wherein the computer instructions include checking if a refresh indicator satisfies a predetermined condition related to degradation of the data over time;
    wherein the computer instructions further comprise storing the refresh indicator on the magnetic medium at a lower density than the data.

59. The storage medium of claim 58 wherein the data is written to the magnetic medium with a grain diameter below 100 Å.

60. The storage medium of claim 58 wherein an amplitude of a readback signal of the data is used as the refresh indicator by the computer instructions.

61. A storage medium comprising:
    a disk carrying data and having at least one property selected from a group of properties consisting of (a) spacing between adjacent magnetised locations of the magnetic disk less than 50 nm (b) recording density for the data greater than 500 kFCI (19685 kFCm) (c) grain diameter less than 100 Å and (d) enemy ratio less than 50 KuV/KBT so as to cause spontaneous degradation over time;
    wherein the disk carries a refresh indicator that indicates a predetermined condition related to degradation of the data over time;
    wherein the refresh indicator is carried on the disk at a lower density than the data.

62. The storage medium of claim 61 wherein the data is written to the disk with a grain diameter below 100 Å.

* * * * *

UNITED STATES PATENT AND TRADEMARK OFFICE
CERTIFICATE OF CORRECTION

| | |
|---|---|
| PATENT NO. | : 7,196,860 B2 |
| APPLICATION NO. | : 10/660873 |
| DATED | : March 27, 2007 |
| INVENTOR(S) | : Alex |

It is certified that error appears in the above-identified patent and that said Letters Patent is hereby corrected as shown below:

<u>Column 16</u>
Line 51, "enemy" should be changed to --energy--.

Signed and Sealed this

Fourth Day of September, 2007

JON W. DUDAS
*Director of the United States Patent and Trademark Office*